US011560783B2

(12) United States Patent
Phillips (10) Patent No.: US 11,560,783 B2
(45) Date of Patent: Jan. 24, 2023

(54) DYNAMIC PUMPJACK LOAD VERIFICATION

(71) Applicant: Walter Phillips, Huntington Beach, CA (US)

(72) Inventor: Walter Phillips, Huntington Beach, CA (US)

(73) Assignee: Walter Phillips, Huntington Beach, CA (US)

( * ) Notice: Subject to any disclaimer, the term of this patent is extended or adjusted under 35 U.S.C. 154(b) by 232 days.

(21) Appl. No.: 15/929,928

(22) Filed: May 29, 2020

(65) Prior Publication Data

US 2020/0386092 A1    Dec. 10, 2020

Related U.S. Application Data

(60) Provisional application No. 62/898,521, filed on Sep. 10, 2019, provisional application No. 62/854,283, filed on May 29, 2019.

(51) Int. Cl.
*E21B 43/12* (2006.01)
*E21B 47/009* (2012.01)
*G01L 5/00* (2006.01)

(52) U.S. Cl.
CPC .......... *E21B 47/009* (2020.05); *E21B 43/127* (2013.01); *G01L 5/0061* (2013.01)

(58) Field of Classification Search
CPC .............................. E21B 47/009; E21B 43/127
See application file for complete search history.

(56) References Cited

U.S. PATENT DOCUMENTS

| | | |
|---|---|---|
| 3,216,245 A | 11/1965 | Seed |
| 3,343,409 A | 9/1967 | Gibbs |
| 3,355,938 A | 12/1967 | Neely |
| 3,457,781 A | 7/1969 | Elliott |
| 4,947,936 A | 8/1990 | Ellwood |
| 5,182,946 A | 2/1993 | Boughner |
| 5,252,031 A | 11/1993 | Gibbs |
| 5,464,058 A | 11/1995 | McCoy |
| 7,779,911 B2 | 8/2010 | Akselberg |
| 9,810,214 B2 | 11/2017 | Pons |
| 10,018,032 B2 | 7/2018 | Pons |
| 10,815,770 B2 | 10/2020 | Moreno |

(Continued)

*Primary Examiner* — Giovanna Wright (57) ABSTRACT

A properly calibrated load-cell is critical for the safe operation of a rod-pumping system. Load readings are utilized for shutdown thresholds, and incorrect measurements can cause those safe load limits to be exceeded. Correct surface load, combined with position measurement, is also important for the diagnosis of the complete pumping system. The diagnostic method for calculating down-hole conditions presents an interesting opportunity to validate surface load measurements, even from the incorrect load measurements themselves. The calculated down-hole dynamometer card will be transposed on a distinct diagonal with respect to both load and position, if the input surface load measurements are incorrect. A load offset can then be identified from this shifting and the surface load measurements can be corrected. Calculated pump cards have been traditionally aligned with the surface dyno card position, and so this diagonal pump card shifting correlation with incorrect, or unexpected, surface load has not been realized.

19 Claims, 8 Drawing Sheets

(56) References Cited

U.S. PATENT DOCUMENTS

2017/0152737 A1\* 6/2017 Pons .................... E21B 43/127
2019/0203579 A1 7/2019 Phillips
2020/0370413 A1 11/2020 Phillips \* cited by examiner

DYNAMIC PUMPJACK LOAD VERIFICATION

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of hydrocarbon recovery operations. More specifically, the present invention relates to the production of fluids to the surface using rod pumping equipment. The invention also relates to a method for validating and calibrating a load-cell signal during the operation of the rod-pumping system. More generally, the method can identify incorrect or unexpected loads. Specifically, it utilizes dynamic calculations known commonly as the wave equation to determine pump conditions, which can be compared against expected conditions in terms of load and position. Further, the complex interaction between load and position calculated at the pump can indicate errors in the input/measured load data at surface.

This is particularly related, but not limited to, incorrect load readings due to an incorrectly calibrated load-cell. Additionally, real and specific load components may be identified. Fluid density, for example, can affect the rod buoyancy, and thus the effective weight of the rods. Although this is a real load shift, it is important to identify. Tubing and casing pressure can affect the perceived rod loading, but this is typically only present during the up-stroke. Fluid level in the casing annulus can also impact the loads observed during the up-stroke. Tensile load effects caused by friction acting at distinct points along the rod-string can alter the loads, but this affects both the up and down-stroke loadings, but in different ways. Downhole frictional forces, both in location and magnitude, may be identified by the method presented herein.

TECHNOLOGY IN THE FIELD OF THE INVENTION

Proper load-cell calibration is a challenge in rod pumped wells. A tare procedure would normally be used to zero the load-cell. This involves physically removing load from a load-cell to determine the electrical signal at "zero" load. On a rod pumped well, this is a difficult and potentially dangerous procedure as the rod load needs to be physically lifted from the carrier bar assembly and load-cell. Because of this, rod-pump load-cells are constructed and factory calibrated such that they provide a consistent signal so that each load-cell is identical in terms of signal output. This allows load-cells to be installed with minimal in-field calibration. In practice, load-cells can be damaged, equipment can become misadjusted, controller parameters may be incorrect, fluid properties may change, downhole friction may increase, etc. All of these may manifest as incorrect load values, or as real but improperly attributed loads, portrayed to the end equipment.

Incorrect load measurement can result in a failed safety shutdown or improper down-hole analysis through calculated analytic methods. Because a proper calibration process requires physically removing applied load from the load-cell on an operating well, recalibration is rarely performed after the initial installation. Miscalibrated load-cells are typically replaced, rather than re-calibrated in the field since the primary expense is removing the load. Since there are currently no reliable and automated methods of identifying load-cells that are in need of recalibration (or replacement), this procedure is only preformed if the load-cell is egregiously out of calibration, on the order of many thousands of pounds. This represents a significant disconnect between operational safety parameters and perceived load. More critically, this condition may go uncorrected for extended periods.

Load-cell offset can change for several reasons, but as discussed above, load miscalibration is difficult to detect and identify. The absolute load reading during normal pumping operations can vary widely and so a load-cell that is off by a few thousand pounds may not be obviously incorrect. Furthermore, the load-cell reading itself is typically the only normal measure of load. There is no inherent secondary load reading, from which to validate or verify the load-cell signal accuracy. The only way to identify incorrect load-cell calibration is to either recalibrate/replace it entirely, or to place a secondary load-cell inline and compare the resulting measurements. Both recalibration and secondary measurement verification require significant interaction with the well. This approach is also not capable of continuous monitoring and assessment of load-cell calibration from the existing measurements alone.

Automatically identifying faulty load measurements directly at the wellsite, or across multiple wells would provide a much-needed way of addressing the critical safety concerns associated with incorrect loads. In cases where the perceived load is substantially incorrect, an operator may identify the condition relative to an expected load value obtained by predictive methods utilizing well equipment and operating parameters. Comparing theoretical and actual load values has several inherent problems. Downhole friction, for example, can increase the loads in a running well, relative to the predicted loads. This is a normal condition. Incorrect fluid properties, namely density, can result in a substantial difference between real and optimal conditions. The discrepancy between predicted and measured loads, as an indication of a miscalibrated load-cell, is rarely trusted.

Surface loads and positions through a given pump stroke are used in a complex mathematical algorithm to determine dynamic loads and positions at the far end of the rod-string. In other words, the conditions at the downhole pump can be determined (remotely) by obtaining measurements at surface, combined with known equipment properties. This method was pioneered in the 1960's by Sam Gibbs (U.S. Pat. No. 3,343,409) and is commonly known as the Wave Equation. The wave equation is not unique to oil and gas applications as it is a general mathematical approach to solving complex systems. As applied to rod-pumped wells, the wave equation has proven extremely useful in designing and diagnosing pumping conditions. There are however several drawbacks as the algorithm is currently implemented. The algorithm does not inherently validate input parameters. Of note here is the validity and accuracy of the measured surface loads. Additionally, the effects of mechanical friction are not adequately addressed through existing implementations. This is primarily because downhole friction, as applied to the rod-string in a pumping well, is difficult to measure and simulate.

Currently the only means to predict downhole friction is by inference based on surveyed wellbore geometry, also referred to as a deviation survey. There are several problems with this approach as the actual friction points in a well may differ from the surveyed geometry. The method disclosed herein attempts to directly quantify friction points based on measured tensile load, by observing quantifiable differences from expected load and positions. This method works without knowledge of the wellbore geometry. Wellbore geometry can, however, be utilized to further improve the accuracy of well diagnosis and design. In particular, this method relies on expected rod weight in fluid as a key parameter. If some portion of the rods are resting on a deviated wellbore section, that will reduce the expected weight. While this reduction in expected rod weight is identifiable through the disclosed method, the context of wellbore geometry can better attribute that weight reduction. Knowledge of wellbore geometry is not, however, strictly required.

BRIEF SUMMARY OF THE INVENTION

A need exists to identify an improperly calibrated load-cell from the measurements alone. The ability to determine if the load-cell is miscalibrated is sufficient, but an additional quantification of the load error is also useful. The method presented herein utilizes a complex interaction between load and position, as well as system dynamics such as rod length, material, and motion dynamics to determine load-cell errors even if the load measurements are incorrectly calibrated. A method for calculating down-hole conditions, known commonly as the wave equation, is used to determine down-hole load and position from measured surface load and position. As one would expect, if incorrect surface load were input, the corresponding down-hole load would also be off. Interestingly, and non-obviously, the down-hole position is also affected by incorrect surface load values through the wave equation calculations. The resulting down-hole pump dynamometer card is shifted not only vertically with the miscalibrated load, but also horizontally by position. The manifestation of calculated load and position plot transposes the down-hole dynamometer card on a distinct diagonal, and is readily identifiable.

The phenomenon of the diagonally shifted calculated down-hole pump card has remained hidden because of a common industry practice of aligning the down-hole dynamometer position card with the surface card position. This artificial downhole pump card position shifting to zero has become an industry standard practice to visualize pump stroke length relative to surface stroke length. It is convenient and intuitive to align the minimum surface and pump positions to the same starting point, or zero, in order to determine relative surface vs. pump efficiency. Unfortunately, in artificially shifting the pump cards to zero position, this diagonal shifting phenomenon and correlation between diagonal card location, and surface load calibration has remained unobserved in practice.

A similar effect of this diagonal shifting of calculated downhole load and position occurs when mechanical sliding friction acts along the rod-string. In this case, the measured surface loads are correct, but some additional force is added during the up-stroke (and subtracted on the down-stroke). One could consider this as a more general case of the miscalibrated load-cell, specifically in the context of the calculated downhole conditions. The miscalibrated load-cell gives an incorrect input to the wave equation, yielding an incorrectly calculated downhole card. In the case of downhole friction, the surface load is correctly measured, but the existing implementations of the wave equation do not adequately address and remove the friction induced tensile forces, and so the calculated downhole card is also incorrect. This is the so-called Gibbs' Conjecture and is discussed briefly below.

Another key parameter of interest in the wave equation is fluid density, which directly affects the weight of the rods, which are submerged in that fluid. If this fluid density parameter is incorrect, the expected static weight of the rods will also be incorrect. The dynamically calculated forces will then be based on erroneous static rod-loading and thus the calculated downhole pump card will be shifted, again, on a distinct and identifiable diagonal. Unlike friction, this buoyancy effect is independent of direction of travel. Once identified, it can be relatively easy to diagnose fluid density through established methodologies.

Incorrect tubing and/or casing pressure will alter the loads seen at surface. Similarly, fluid level in the casing annulus will impact the measured loads seen at surface. In these cases, the altering force is only present during the up-stroke, as those loads only contribute to the fluid load on the pump while lifting fluid to surface. During the down-stroke, no fluid is lifted and so the net force acting on the pump plunger is effectively zero. While these are real forces, it is desirable to account for them to accurately diagnose the operation of a running well. While this method may not distinguish casing/tubing pressure from fluid level effects, it can identify unexpected loads during a specific pump state. This enables the method disclosed herein to flag those parameters as possibly incorrect. Identification of possible errors allows the operator to further diagnose the set of input parameters.

BRIEF DESCRIPTION OF THE DRAWINGS

FIG. 4A and FIG. 4B show the effects of the viscous damping term on the calculated downhole card. This is a known effect, and is presented as a contrast for other effects presented. FIG. 4A shows a damping factor of 0.02 and is plotted relative to an ideally damped card. FIG. 4B shows a damping factor of 1.00 and is plotted relative to an ideally damped card.

FIG. 5A and FIG. 5B show an artificial surface load adjustment and its corresponding impact on the calculated downhole card. This simulates frictional forces as the adjusted load force is applied opposite of the direction of rod travel. FIG. 5A shows an adjusted surface load of 500 pounds added during the up-stroke and reduced during the down-stroke. FIG. 5B shows an adjusted surface load of 725 pounds reduced during the up-stroke and added during the down-stroke FIG. 6A and FIG. 6B show the impact of an improper load-cell span on the downhole card. This is simulated as a multiplier that makes the perceived load value unit larger or smaller than the displayed unit of pounds. In this illustration, the minimum surface load is held constant so the effects can be more easily visualized. FIG. 6A shows the surface plot reduced by 50% and scaled to the minimum load. FIG. 6B shows the surface load increased by 150% and scaled to the minimum load. The resulting changes on the calculated downhole pump card can be seen.

FIG. 8A and FIG. 8B show representative real-world dyno cards and the corresponding distortional friction effects on the calculated downhole card. FIG. 8A is indicative of shallow friction acting near the surface. FIG. 8B is indicative of deep friction acting at some substantial distance from the surface.

DETAILED DESCRIPTION OF CERTAIN EMBODIMENTS

Definitions

The dyno (or dynamometer) card refers to the common plot of load vs. position for a single stroke of the pumping system. Dyno cards are gathered at surface from measured load and position. The downhole pump card (and at arbitrary depths along the rod-string) is calculated through a mathematical method commonly referred to as the "wave equation", described below.

The well controller refers to an existing industrial well control system. These are often referred to in the industry as a pump-off controller (POC). Pump-off controllers are responsible for digitizing load and position measurements and controlling the operation of the well. This includes safety shutdowns based on load thresholds but can also include "normal" shutdowns due to operational conditions. The "pumped off" condition refers to the state of the down-hole pump, where the fluid displaced by the pump exceeds the inflow from the reservoir. The pump then does not have sufficient fluid for a full pump stroke, and this incomplete pump fillage can cause adverse mechanical conditions, as well as decreased pump efficiency. The pump-off controller detects this condition and then idles the pump, or turns the "pump off", for a predetermined time period to allow the reservoir to replenish fluid around the pump.

Pump state refers to the state of the surface or downhole pump. Typically, this is either the up-stroke, or down-stroke. These phases can be further classified by the downhole valve states, or by the discrete top or bottom of stroke. Because of the length and elasticity of the rod-string, the surface state and pump state may be slightly out of phase as the wave travels from one end of the rods to the other.

The wave equation refers to the general mathematical approach to calculate down-hole pump conditions entirely from surface load and position measurements. Alternatively, the wave equation can predict conditions based on expected running parameters such as surface motion and pump load. It should be noted that the wave equation has several solution methodologies and approaches. While the observation of diagonal pump card shifting may apply to other wave equation approaches, the method discussed here utilizes the finite difference approach.

The finite difference approach to solving the wave equation is well-known in the industry and is a general mathematical approach. In industry terms, this is sometimes referred to the Everitt-Jennings method because of a key paper (SPE-18189, "An Improved Finite-Difference Calculation of Downhole Dynamometer Cards for Sucker-Rod Pumps"). In this paper the mathematical approach, which had already been utilized in the industry for some time, was thoroughly detailed. The Everitt-Jennings method actually refers to the method for iteratively obtaining key parameters for the algorithm but is often conflated with the general finite differences algorithm itself. Finite Differences and Everitt-Jennings are often used interchangeably in the industry. In strict terms, they are not the same.

In the finite difference approach, the surface loads are normalized by subtracting the expected rod weight from the surface load measurements. This is done to eliminate static stretch that is applied equally during the stroke. The method initialization procedure then utilizes Hooke's law to obtain an additional set of relative positional displacements at a point deeper along the rod-string. The finite difference method then utilizes Taylor series approximation to recursively calculate the relative positional displacements down the rod-string from associated relative displacements, which were previously calculated. The finite difference method finally utilizes the calculated displacements at the pump to determine the applied load to induce that stretch.

Viscous damping is related to the effects of fluid flowing through the tubing and around the sucker rods. Viscous damping is velocity and directionally dependent. Damping, and its effect on the calculated dynamometer cards is known and thoroughly integrated in the existing implementations of the wave equation. The Everitt-Jennings paper specifically finds the optimal value for this term.

Mechanical friction, or Coulomb friction, is a result of the contact between rods and tubing due to path deviations in the wellbore. Because of this, friction may act at distinct points along the rod-string, or may be spread over larger areas. Mechanical friction is independent of velocity, once in motion. Static friction differs from sliding (or kinetic) friction. Frictional effects at extremely low velocities may also differ. This is important as the pumping dynamics transitions from sliding to static friction, and back, multiple times during the stroke. Furthermore, the rod velocities slow significantly as the surface equipment approaches the top and bottom of the stroke. The normal force applied to the rods, often referred to as side-load, can affect the magnitude of the frictional forces in the direction of rod travel.

Rod stretch, or rod elasticity, is a known property of the rod material and length. The constant $k_r$ is used to denote this property. The constant $k_r$ is an interesting value in the context of rod stretch and is reflected in the static stretch that would otherwise be observed if surface loads were in fact different. Recall that the industry practice of aligning the pump card to the surface zero position obscures the phenomenon of diagonal shifting. As a result of this artificial horizontal shifting, the significance of this key translation has been unobserved. Previous observations of incorrect surface load were only apparent with a corresponding and equal vertical load shift of the pump card.

Another observation is that load correction calculations can be applied at arbitrary depths during the calculation. This can, in some respects, correct for friction-induced load values. Understanding how friction impacts the wave equation can greatly improve our understanding of the behavior and diagnosis of the rod pumped system. Identifying the correct depth-dependent friction-induced load corrections is a critical component of addressing the Gibbs Conjecture; briefly stated, imperfections in the friction models will result in imperfections in the calculated pump card. The effects of downhole friction can be identified utilizing the method disclosed herein.

In the finite difference method, the down-hole pump card is ideally set on the zero-load line during the down-stroke state of the downhole pump. "Set" along the zero-load line means the correct and true pump card, without any erroneous distortions should be zero load during the down-stroke. Unaccounted forces can distort and grow the card such that the bottom of the card may dip below zero. The bottom of the pump card may not necessarily indicate where it is truly set. Some degree of understanding needs to be applied to determine where the card is actually set when such distortions are present.

Other wave equation solution methods place the downhole card below zero to illustrate the effects of buoyancy. This should not be a problem for the overall method presented herein, as the load reference, for determining diagonal shifting, simply needs to be adjusted accordingly. For simplification of the discussion, the downhole dyno card is expected to be set at zero as the primary reference. This means most of the down-stroke load values should rest at zero load, or, in the case of sever distortions, the card may extend below zero. The base of the pump card would be the un-distorted optimal values. Since other parameters may cause the calculated pump card to dip below the zero-load line, this condition alone is not necessarily an indicator of incorrect load-cell calibration.

A load-cell that is miscalibrated low, meaning that it is perceived reading less than the actual load, will result in a calculated down-hole card being pushed downward. That downward shift alone would not necessarily be considered abnormal as the pump card can be expanded vertically, and thus the loads can dip below zero, due to factors such as down-hole friction or fluid viscosity. A low-reading load-cell is also a dangerous condition because the real loads on the system are in fact higher. This could result in the physical load exceeding the safety setting value because the pump-off controller reads loads that are lower than the mechanical system is actually experiencing.

Conversely, a load-cell that is incorrectly calibrated, reading higher than actual load, would cause the pump card to be lifted from the zero-load line. Again, because the pump card can be expanded vertically from friction, damping, or other parameters, the calculated pump card may still appear to be set at, or near, zero when in actuality it is set well above the zero-load line. This condition is immediately less of a concern, as "properly" configured numerical shutdown load values would be reached when the actual load is less. This can however result in configuring the shutdown safety loads abnormally high to compensate for premature shutdowns. If/when the load-cell calibration is corrected, the safety shutdown settings may inadvertently remain set abnormally high.

The method presented here utilizes the phenomenon of diagonal shifting of the calculated pump card and this relation to incorrect surface loads to further identify the conditions discussed above. If the load readings are incorrectly high, the down-hole card will also be position shifted left. Likewise, if the acquired loads are lower than actual loads, the pump card will be position shifted right. Zero position at the pump would be defined as the static position of the pump when the surface unit is also at the bottom of stroke, and all dynamic forces have been eliminated. Under dynamic conditions, the lowest point (or position) of the down-stroke may be above or below this static zero position.

As with loads, the calculated position may be affected by dynamic conditions. Similar to how the pump card is ideally set at the zero-load line, the pump card is also "set" at the zero-position line. More specifically, the pump card should cross, or in most cases touch, the static zero position in a dynamic condition. The position being shifted left or right alone (in a dynamic condition) is not enough to determine load-cell miscalibration. The combination, however, of both calculated pump load shifting, and pump position shifting can identify the presence and magnitude of the miscalibrated loads.

Calculated pump card shifting of both load and position (due solely to shifted surface load measurements) occurs along a distinct diagonal. A pump card that is shifted up and to the left indicates the surface load is incorrectly higher than actual loads. A pump card that is shifted to the lower and to the right indicates surface loads are incorrectly lower than actual loads. Once the condition is identified as a load calibration issue, the vertical displacement of the diagonally shifted calculated pump card (from its natural zero load position) will indicate the magnitude of the surface load miscalibration. This magnitude can then be reapplied as an additive (or scaling) correction factor to the original surface load measurements. The wave equation calculations can then be re-run to observe the new pump card placement. If the determined surface load factor was correct, the newly calculated pump card should now be set at the zero-load line. If the observed load miscalibration value was incorrect, or more importantly if the surface load was not miscalibrated, the pump card will not be set at zero. This verification step helps to determine the correctness of whether the load-cell is in fact miscalibrated. Other factors such as fluid density or incorrect rod-string details may contribute to the determined load offset, but these can be identified prior to deploying a technician to perform a physical re-calibration.

The slope of the diagonal shifting of the calculated downhole pump points, due to incorrect load input, is the spring constant of the length of sucker rods. In industry terminology this constant value is known as $k_r$, referring to the constant "k" from Hooke's Law (F=−kx). The constant $k_r$ is a property of the length and type of rods and is typically plotted with positive slope on the surface card to indicate rod stretch during the initial portion of the up-stroke. When plotted at the pump in the context of diagonal shifting of the pump card, the resulting line slope is $-k_r$ and can be plotted from any point along the pump card. This allows one to determine whether the pump card is set at zero load, or shifted along this specific diagonal. Moreover, it allows one to determine points that may be candidates given the $k_r$ of the full rod-string, or partial $k_r$ values corresponding to shorter rod sections where friction may be acting.

The diagonal shifting occurs along a distinct slope, specifically $-k_r$. This is the elastic constant corresponding to a length of rods and is a known property. As a result, the diagonal shifting can be verified along this distinctive slope. If the load-cell is miscalibrated, the $k_r$ value will correspond to the entire length of rods. If downhole friction is acting on the rods, a different $k_r$ corresponding to the length of rods between the point of friction would indicate the depth of said friction. In the case of a miscalibrated load-cell, the erroneous loads generally act consistently throughout the stroke. In the case of downhole friction, the imparted force depends on the direction of rod travel. In the downhole pump card, this can be determined by observing diagonal shifting separately on the up and down-stroke.

Ideally, the identification of miscalibrated load-cells should be used to trigger an alert and signal a need for physical calibration of the load-cell in the field. Because this miscalibration state may represent a potential safety concern (safety shutdown not being reached because the loads are read lower than actual loads), it may be preferable to immediately apply the identified load correction factor directly and automatically to the pump-off controller itself, rather than continue to run in the miscalibrated state until a technician can be dispatched to properly calibrate the system. This method may be integrated directly into the pump-off controller or implemented remotely. Because the on-site well controller handles safety shutdowns, the correction factor ideally would be applied at the controller (whether it is calculated and artificially corrected on the controller itself, or applied through a remote configuration) to rectify incorrect load-cell offset calibration.

The corrective load factor can also be applied to analysis software to calculate a more accurate and representative pump card. Of important note, the incorrectly shifted surface load does not significantly affect the shape of the calculated card, so most qualitative analysis would continue to work, as is the current state of the field, even with incorrect surface load readings. Quantitative analysis, such as fluid loading on the pump, or determination of other specific down-hole conditions, requires accurate load values calculated at the pump. Identifying and correcting an improperly calibrated load-cell can improve quantitative analysis. This method can be applied on an individual well, or on historical archived data across many wells.

Description of Selected Specific Embodiments

Figure 1:
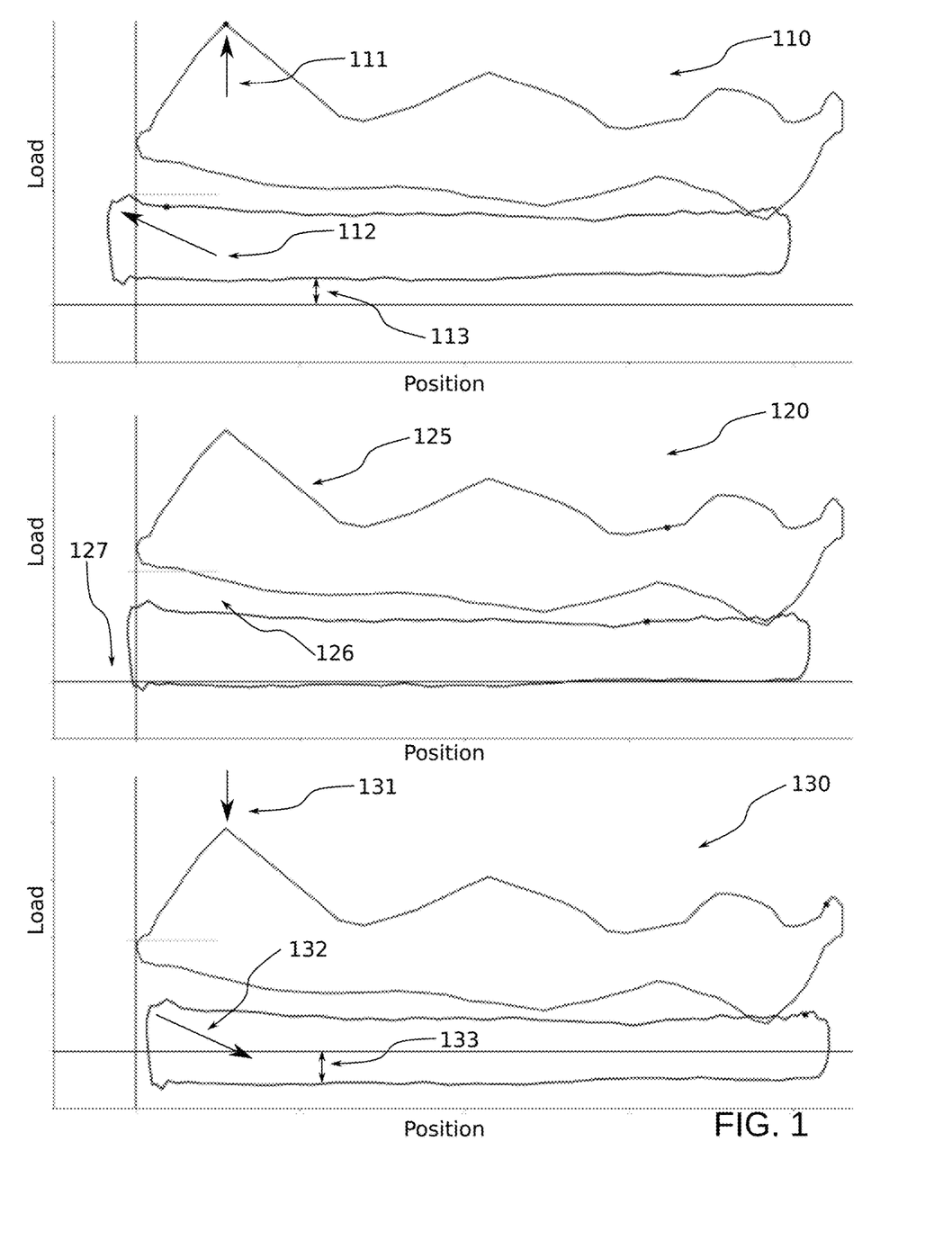
FIG. 1 shows the phenomenon of diagonal shifting of the downhole pump dynamometer card. Three iterations are presented; the surface loads artificially shifted up, the correct loads, and finally the surface loads artificially shifted down. The corresponding effects on the calculated downhole cards are also shown. The downhole dynamometer cards can be seen shifted along a distinct diagonal.

FIG. 1 illustrates a typical dynamometer card plot (120), as used in the industry. Load and position samples are gathered at surface and plotted against each other. Because the stroke is cyclical, the dynamometer card plots out a loop, returning to the same starting position. The downhole card (126) is calculated from the surface measurements (125) and plotted similarly on the same graph.

FIG. 1 also shows the critical observation and relation between shifting surface load and the resulting calculated downhole load and downhole position. 110 shows a simulated surface load shifting where the perceived loads are higher than the real loads. 120 shows the true and accurate surface loading for comparison. 130 shows simulated surface load shifting where the perceived loads are lower than the real loads. Although these plots are shown with artificially shifted surface loads, relative to the correct loads in 120, the effects are identical on a real pumping well with a miscalibrated load-cell since the adjustments are applied to the raw measurements before processing.

111 shows the surface loads are shifted up. Although only one point is illustrated by 111, each point in the surface plot is also shifted up. The corresponding load effects are shown in 113, where the pump card is correspondingly shifted up by the same magnitude. The critical observation here is shown by 112 where the pump card is shifted diagonally. This slope corresponds to $-k_r$.

120 shows the normal and unaltered data. 125 is the surface dyno card and serves as the basis for the shifted plots of 110 and 120. 126 is the calculated downhole card. 127 shows the expected "zero" load where the correct pump card should be set. This "zero" may be different if the effects of buoyancy are incorporated into the calculated downhole pump card. In these plots, however, the pump card is expected to reside at zero load, shown by 127, during the down-stroke. The pump card being "set" or "residing" at zero means the true pump card. Distortions caused by various factors may make the card extend below zero. Some level of intuition or numerical analysis must be applied to filter through these distortions.

Finally, 130 shows the surface card shifted down (131) relative to the correct loads. 133 shows the corresponding vertical shift of the downhole card. 132, like 112 shows the slope of the shifting, which is $-k_r$ since the load offset is applied at the surface, or over the entire rod length.

Figure 2:
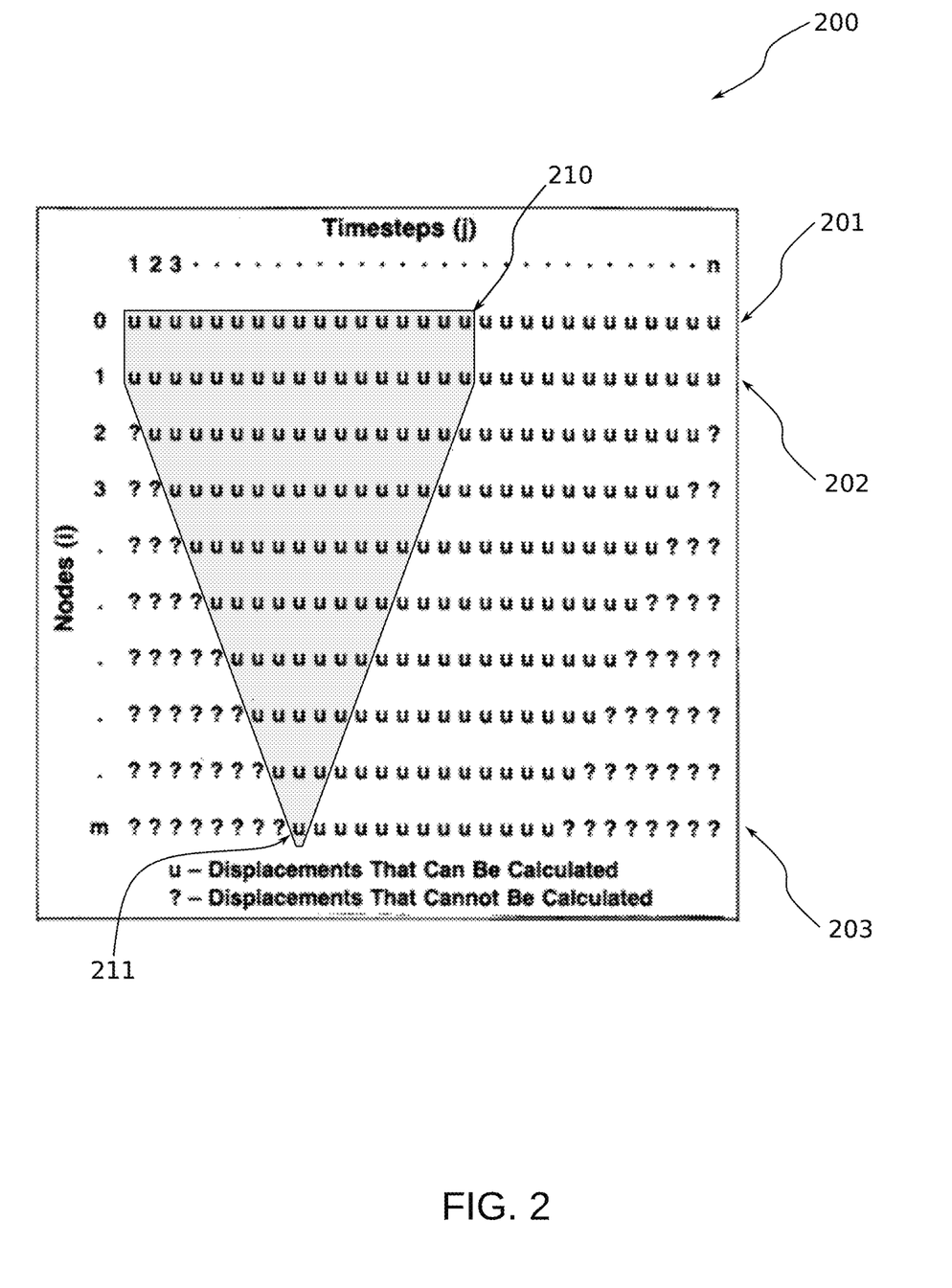
FIG. 2 shows the core algorithm of the finite differences method. Specifically, the relevant intermediate measured and calculated values corresponding to a single pump point is highlighted.

FIG. 2 illustrates the general algorithm on the finite difference approach to solving the wave equation presented by Everitt and Jennings. The finite difference approach is well-known. The table (200) represents time sampled data from left to right, and depth related calculated values (or "nodes") from top to bottom. Of note in this table, the values "u" represent displacement (or relative position) value. In this method, the surface position is used to fill out the first row (201), or "Node 0". The surface load and position are utilized through Hooke's law to calculate the second row (202), or "Node 1", in the table at the first finite depth (or node) along the rod-string. The algorithm then continues calculating positional displacement values by way of a Taylor series and known rod material properties. This calculation utilizes 4 previously calculated position values in the time and space domain to calculate the next, deeper point along the rod-string.

210 shows the relevant displacements that are used to calculate a single pump displacement 211. Position at the pump ("Node m", 211) is obtained through a slightly modified version of the above Taylor series on the last row of the table. Once the position at the pump is known, the load can then be calculated from the displacement values. This completes the calculation of the downhole pump card illustrated in FIG. 1.

Figure 3:
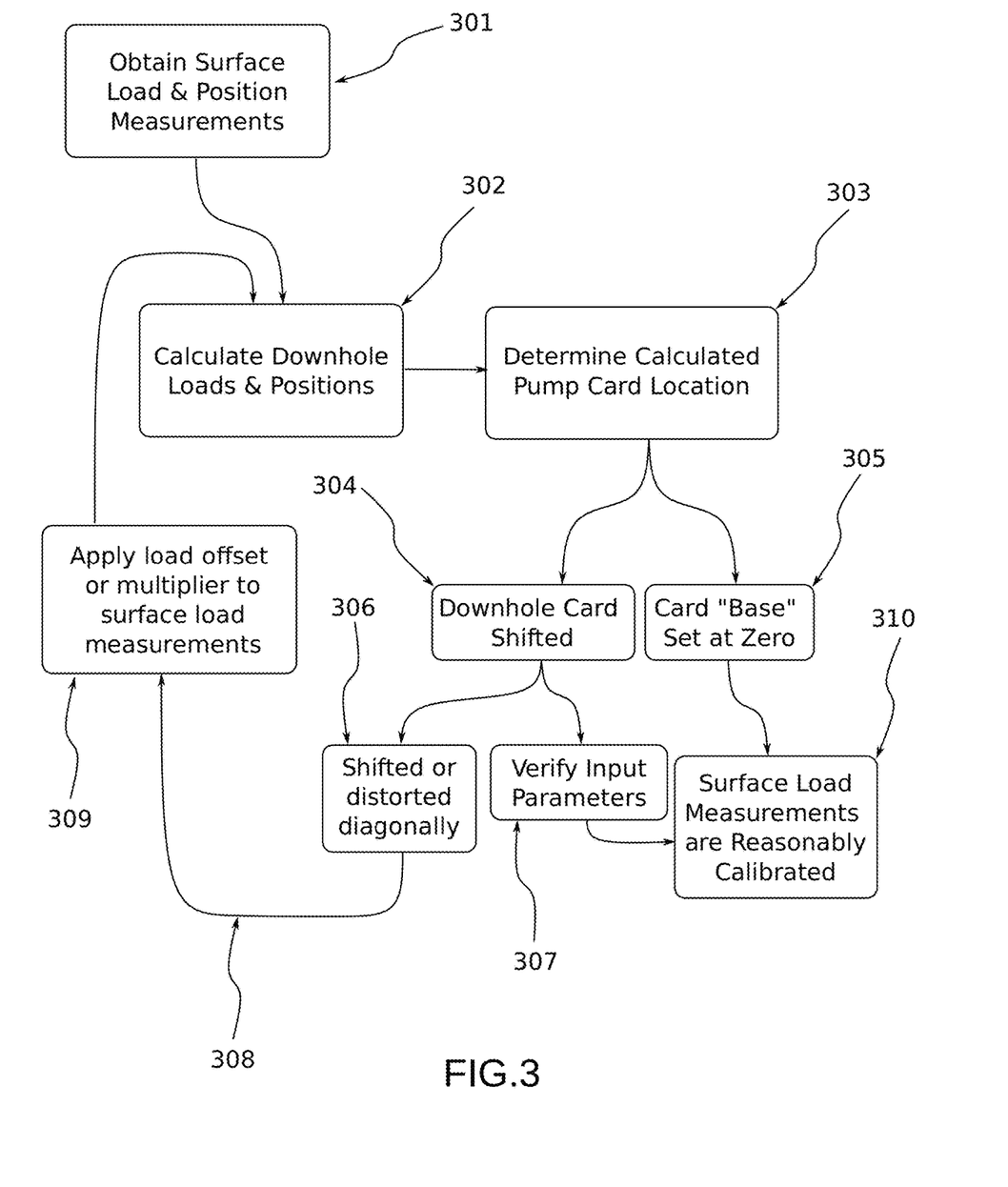
FIG. 3 shows a flow chart of iteratively determining the correct load-cell offset and multiplier from measured load and position data, where the load measurements may be incorrect.

FIG. 3 is a general flow chart for determining load cell calibration accuracy. The obtained load and position measurements, 301, are utilized to calculate a downhole pump card, 302. Ordinarily this would be the conclusion of the downhole pump card calculation. To identify improper surface load values, additional steps need to occur to interpret the calculated downhole data. This starts with 303 where the pump card is analyzed to determine if its general location has been shifted from the expectation. If the pump card is determined (305) to reside at the "zero" load, as referenced by the down-stroke, and illustratively shown in 126 & 127, the process concludes and the surface loads can be reasonably determined to be correct, 310.

If the downhole pump card is determined to be shifted (304), the possibility of a miscalibrated load-cell exists. If the card is not shifted on a distinct diagonal, input parameters should be verified (307). These include fluid properties, which could alter the perceived rod weight through buoyancy, rod properties which could alter the actual weight of the rods, and several other verifiable parameters. If the downhole card is shifted on a distinct diagonal (306) corresponding to a slope of $-k_r$, the observed vertical load shifting of the pump card can be used as a load offset. If the card is determined to be distorted, again on a diagonal, scaled for load, a multiplier value can be determined. 308 shows the feedback loop that utilizes the determined offset or multiplier to adjust the measured surface loads in 309. The calculations are repeated on the adjusted surface loads and the process continues until the pump card is determined to be shifted back to the expected reference load. If the correction factor returns the pump card placement to zero, the load cell is identified as miscalibrated. If the pump card is not returned to zero, the load cell is likely correctly calibrated. An additional iteration can be performed to test another load offset value, or to further refine the offset value. If the offset does not effectively shift the calculated pump card back to zero, other sources of error (307) may be present.

Figure 4A:
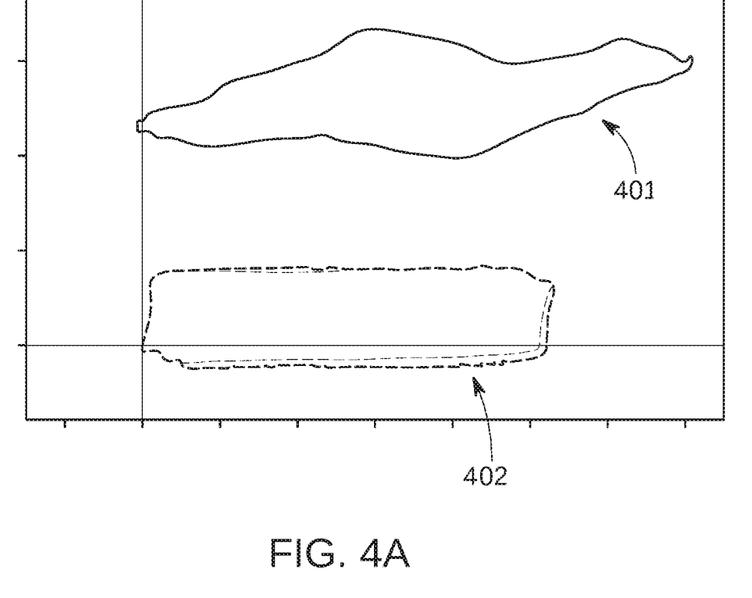
Figure 4B:
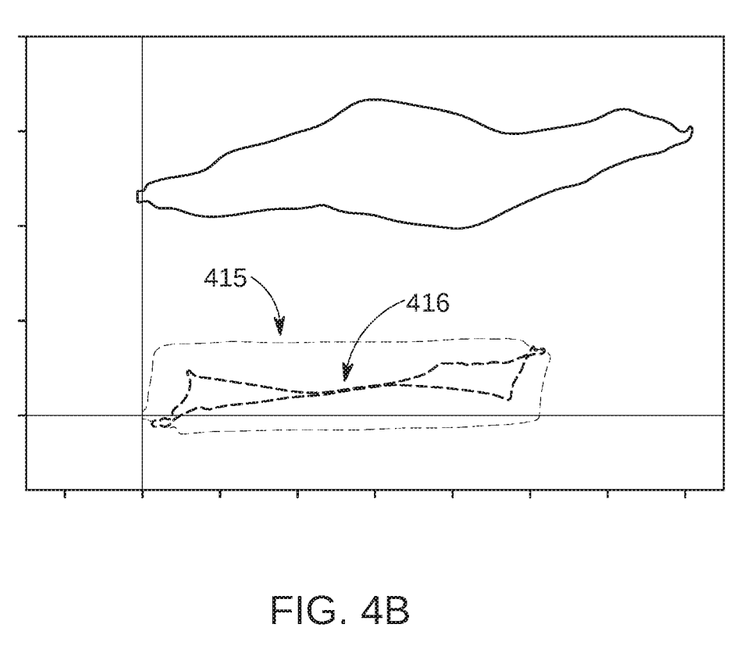

FIG. 4A and FIG. 4B show the effects of the damping term in relation to the pump card calculation. 401 is the measured surface card. The "expert" determined damping coefficients are applied to the silhouette plot on the downhole card. The plot in FIG. 4A shows a slightly underdamped pump card on the down-stroke. This results in the pump card being a bit taller (or "inflated") as an insufficient amount of energy was removed by the small damping factor. Note here the bottom of the pump card (402) is lower than expected. Conversely, the plot in FIG. 4B illustrates an over-damped card where the resulting pump card appears concave. Too much energy was removed by the damping coefficient here. 415 shows the "correct" damping applied, while 416 shows the effect caused by the incorrect damping coefficient. Damping only impacts the downhole calculations when using the wave equation to calculate a downhole card from measured surface data.

It is also of interest how the damping factor is more pronounced towards the middle of the stroke, where velocity is high, compared to the ends, where velocity is low or zero. 416 particularly shows this effect. This illustrates how the damping factor is a velocity dependent term. In this figure, the surface card is unaffected as the damping factor is applied to the calculations in the resulting pump card. The effects of damping are largely known to the industry. These plots are provided for contrast with the effects of miscalibrated load-cells.

Figure 5A:
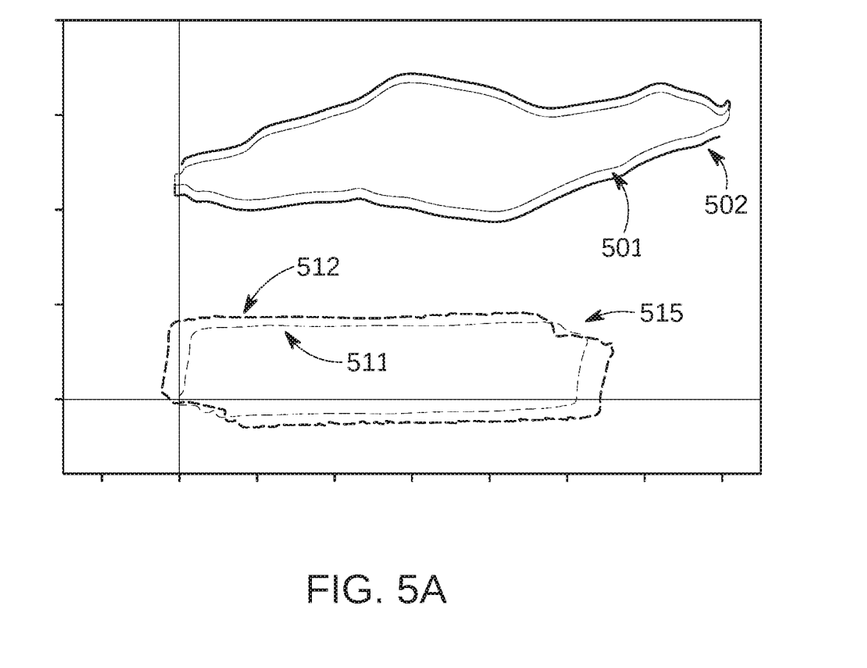
Figure 5B:
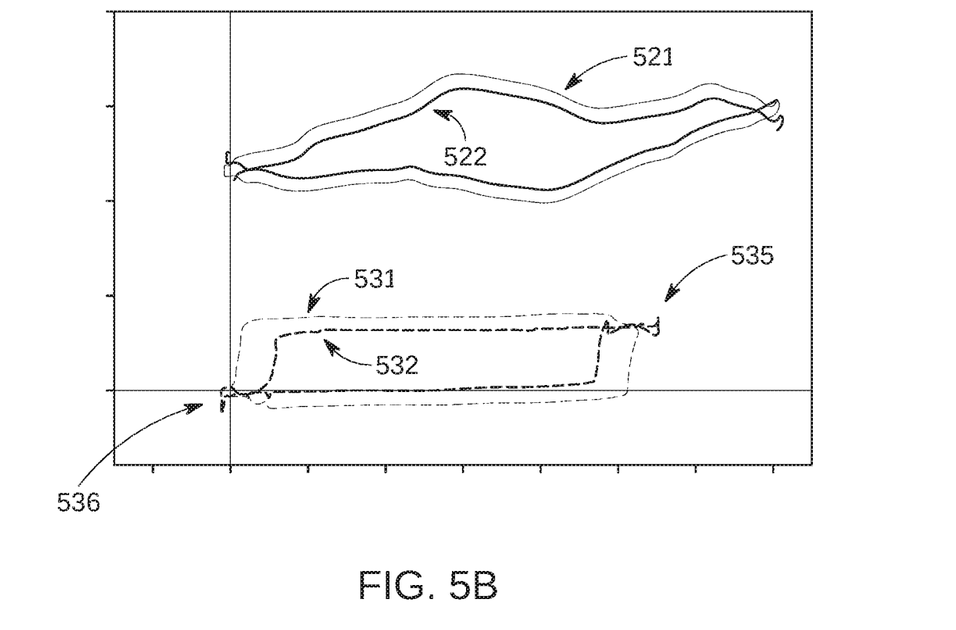

FIG. 5A and FIG. 5B show the effects of changing the load in relation to the direction of stroke. This is particularly illustrative of frictional effects. In this case, load is directly and artificially changed on the surface card to create a change in the pump card according to the diagonal shifting phenomenon described. 501 and 521 show the original, unaltered surface data. In FIG. 5A, 502 shows a load of 500 lbs applied to the surface data. This artificial load is added on the up-stroke and subtracted on the down-stroke. This is how friction acting at the surface typically behaves. 511 and 531 show the "correct" calculated pump card for reference. 512 shows how the pump card is shifted up and to the left on the up-stroke, and down and to the right on the down-stroke. 515 shows an interesting replication of a phenomenon observed in actual wells where the upper right corner of the pump card is rounded off. Likewise, the lower left is also rounded (see 810 and 811).

FIG. 5B shows a load of 725 lbs applied inversely, subtracted on the up-stroke, and added on the down-stroke. This is opposite of how friction should behave. The upper right (535) and lower left (536) portions of the pump card (532) illustrate incorrect pump positions. This is because the input loading has been adjusted by a simple addition to bring the average loads at the pump closer to the expected actual loads. This simple addition of loads is done independent of velocity (but dependent on direction), which holds for the portion of the stroke where the rods are in motion and experiencing sliding friction. At the end of stroke however (top and bottom), the friction transitions from sliding to static, and then back. This transition needs to be accounted for in order to correct erroneous positions illustrated in 535 and 536 that extend to the left and right of the rectangular pump card.

Figure 6A:
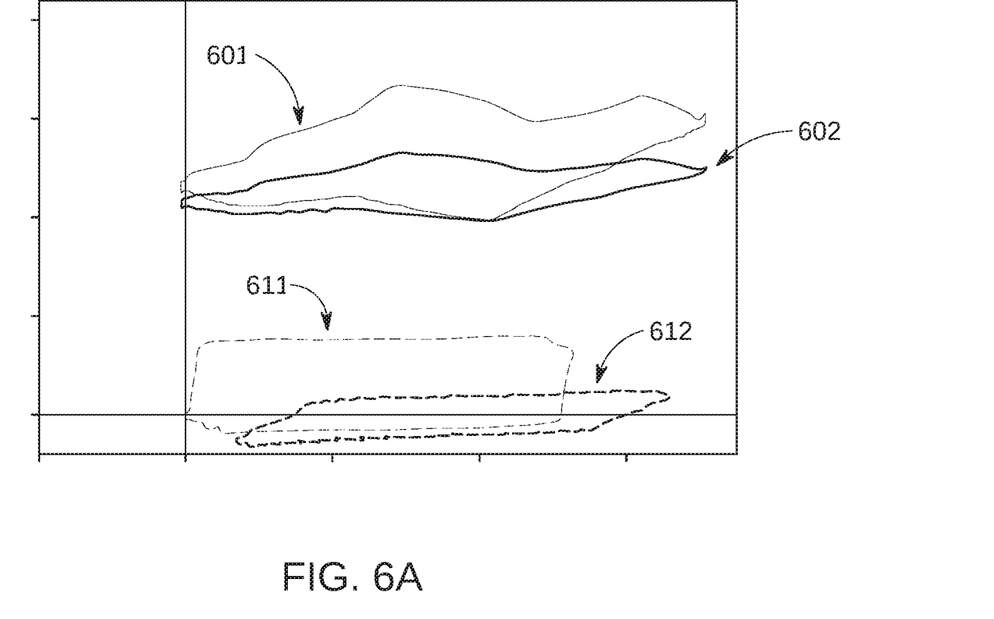
Figure 6B:
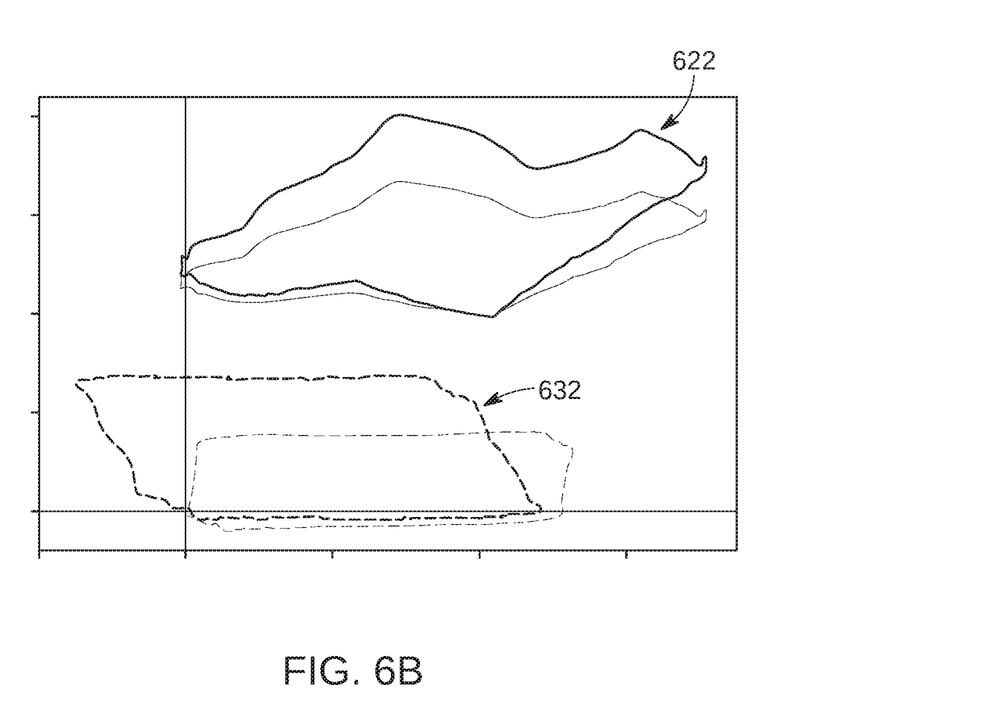

FIG. 6A and FIG. 6B show the results of an incorrect load-cell span. This phenomenon would have previously been attributed to incorrect position and load measurement synchronization. Similar to FIGS. 4A, 4B, 5A and 5B, original unaltered plots are shown in silhouette (601 & 611). In these plots, a scaling factor is applied to each point. To simplify the visualization, the minimum surface load is held so that the plots (601, 602, 622) line up. In other words, the load-cell offset at the minimum surface load is correct, but the span is incorrect. 612 and 632 show the same phenomenon of points being shifted on a diagonal, but this diagonal is not as straightforward as the aforementioned slope of $-k_r$. Recall the surface points contributing to the calculated pump points shown in 210. A range of surface points, in this case, each with a scaling applied, contributes to a pump point. The plots 612 and 632 are diagonally shifted, but a result of a range of points.

Of note here, the plot 612 would ordinarily be diagnosed as unanchored tubing as the tilting of the pump card indicates that condition. This is not the case here. Analyzing the diagonal shifting of points can help determine which condition (unanchored tubing, or bad load-cell span) is occurring. 632 appears to be a condition that indicated bad positional input. Again, this is not the case as the loads have been artificially "stretched" to replicate a load-cell with a bad span adjustment. In these examples the tilting of the calculated pump card is only a result of scaling the surface load data. The load data is artificially scaled from a known baseline to illustrate the change from normal. In an operating well, with a load-cell having an incorrect span calibration, the resulting pump card would be tilted, but previously would have been falsely attributed to other possible sources. The way the pump card is shifted due to the incorrect load span is new and has not been previously identified in the industry.

Figure 7:
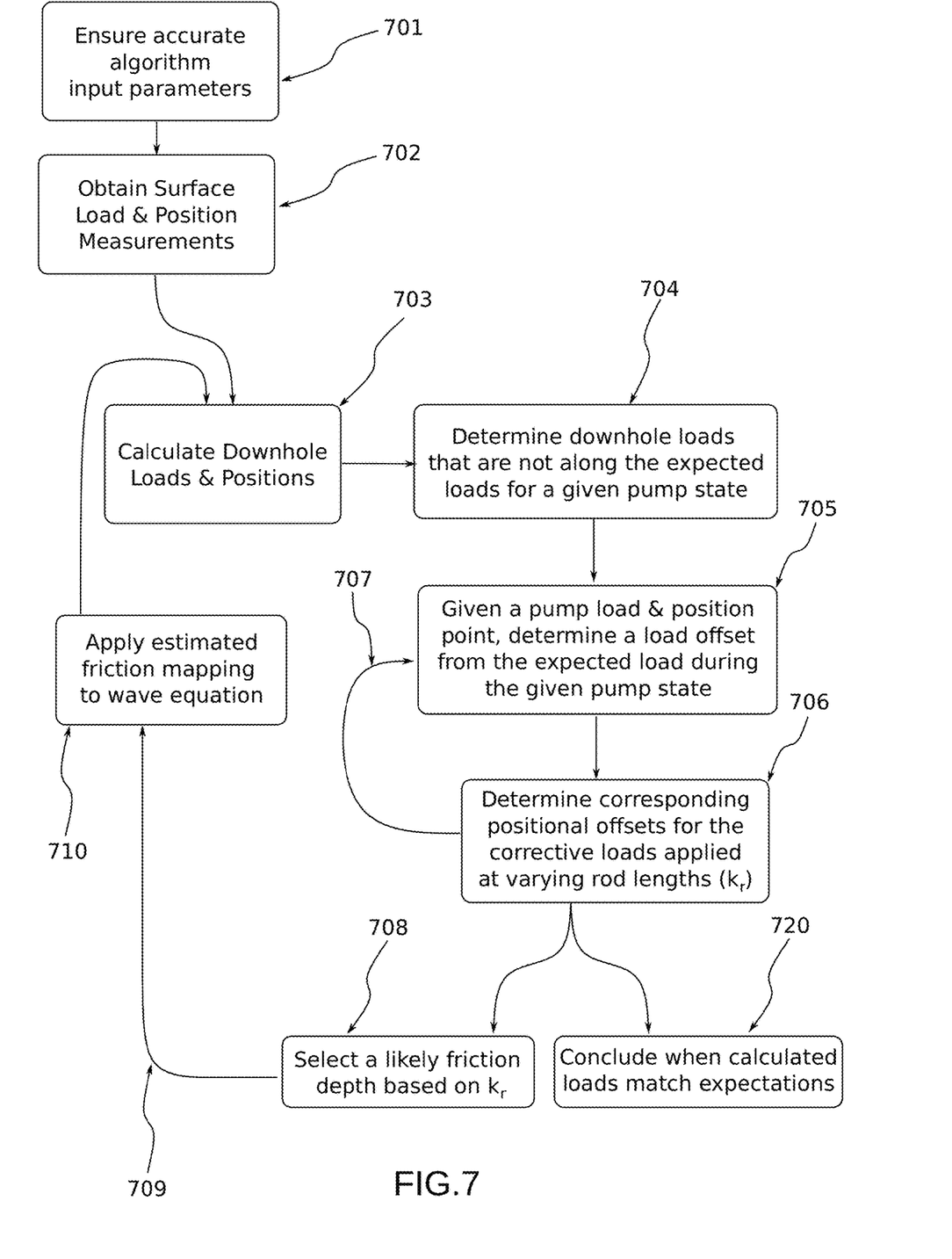
FIG. 7 shows a flow chart to determine frictional effects on the rod-string by observing the corresponding changes and shifting on various data points.

FIG. 7 shows a flow chart for determining downhole friction based on the method presented. While this disclosure primarily addresses loads due to faulty surface measurements, the effect of downhole friction is somewhat similar. Downhole friction causes unexpected loads and this method can be utilized to determine the location and magnitude of those forces along the rod-string. Frictional forces are real forces and so the accuracy and correctness of the input parameters (701) are vital. In other words, the validity of surface load measurements must be established. Fortunately, this method provides such a means to determine that load measurement validity. The process is identical to the normal diagnostic process in obtaining surface measurements (702) and calculating the downhole dyno card (703). To determine the location and magnitude of downhole friction, some expectation of loads during specific pump stages must be known. In general these include "zero" load during the down-stroke, and the fluid load on the up-stroke.

Observing the calculated pump card may yield data points that are not along the expected loads for a given pump state (704). These data points can then be used in accordance with the presented method to determine potential sources of external forces. 705 selects a pump load and position point that are out of the expected load range to analyze. In order to bring this pump point back into the expected load range, a number of $-k_r$ values corresponding to different lengths of rods in the wellbore can be applied, similar to the process outlined in FIG. 3. 706 is repeated (707) for a number of other points (705). Once enough candidate $-k_r$ (or rod lengths and forces) are collected, a likely $-k_r$ candidate can be selected (708), and the corresponding depths and frictional characteristics can be fed back (709) to the wave equation, modified for friction mapping vs depth, 710. The process is repeated until a suitable mapping of downhole friction yields a pump card with loads in the expected range during key pump states, 720.

Figure 8A:
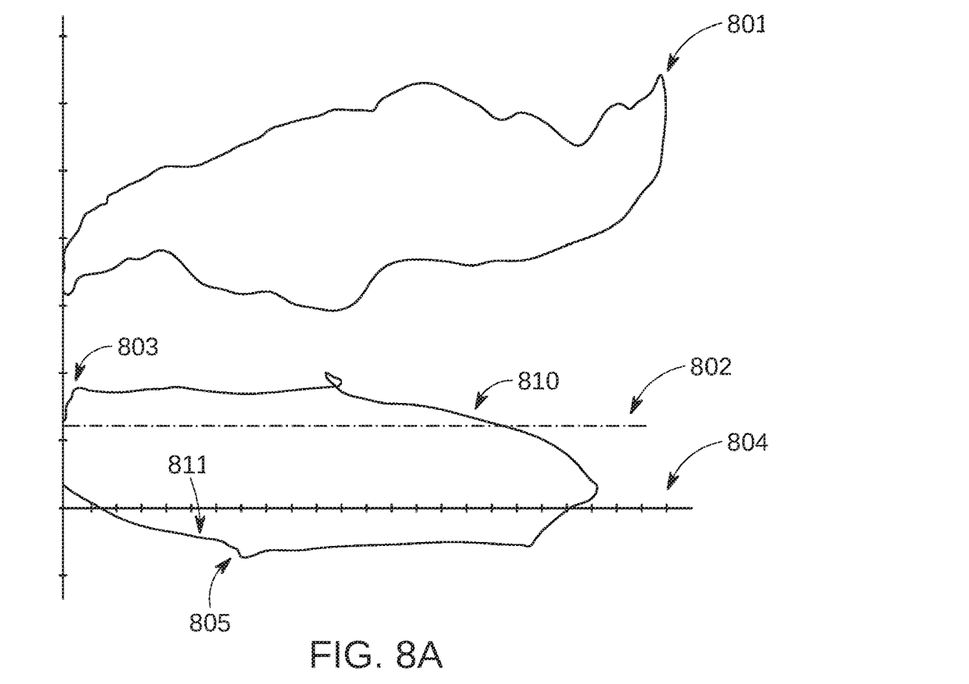
Figure 8B:
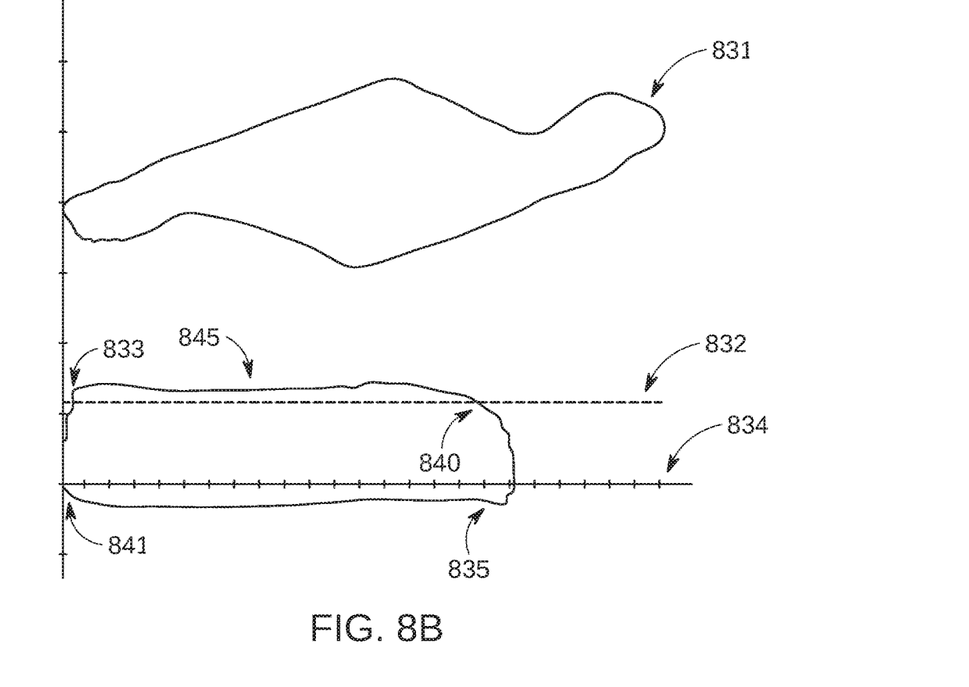

FIG. 8A and FIG. 8B shows the real-world implications of friction in the distorted downhole pump cards. The plot in FIG. 8A shows shallow friction and is reminiscent of the simulated plot in FIG. 5A. 801 and 831 are the measured surface dyno cards, which include the forces due to mechanical friction. 804 and 834 are the expected loads during the down-stroke, while 802 and 832 are the expected loads during the up-stroke. The calculated loads at 803 are pulled up and to the left, relative to the expected load. Likewise, the down-stroke loads in 805 are pulled down and to the right. 810 and 811 show this stretching on the $-k_r$ diagonal. Of interest here is that the $-k_r$ here may not be the full rod-string, but a subset of rods up to the point of friction. In this case it is observed the friction is shallow. As a result, the magnitude, due to tensile induced side-load from the weight below is high, while the stretch is large due to the long rod lengths.

The plot in FIG. 8B shows deep friction. As an aside, 845 shows a small incorrectness in the damping factor similar to, but much less severe than, that shown in 403. This needs to be corrected before the friction can be properly analyzed. The difference between the loads shown at 833 and the expected loads at 832 should be rectified by applying a frictional induced force at a depth somewhere along the rod-string. Likewise, the load difference between 834 and 835 should be similarly rectified by the appropriate friction vs depth mapping. 840 and 841 show the indicative characteristics of deep downhole friction effects on the calculated card. If the appropriate frictional corrections are applied, the pump cards in FIG. 8A and FIG. 8B should become more rectangular.

I claim:

1. A method for determining accuracy of measured surface loads, obtained from a rod-string, extending into a wellbore, in an operational rod-pumped well, comprising; obtaining operational equipment parameters comprising rod material and elasticity, pumping speed, fluid properties, pressure; obtaining time synchronized measured surface load and position data points, on said rod-string, through a given stroke, wherein; processing the operational parameters using a wave equation to obtain calculated load and position data points at a distance along said rod-string from the point of the measured load and position, wherein dynamic acceleration and stretch of the rods under measurement are removed, identifying errors in the measured loads in a dynamic pumping condition without requiring an external calibration reference load measurement, by comparing a shifting of the calculated downhole data point values both horizontally with position, and vertically with load relative to expected values of said calculated load and position data points; controlling operation of a pump based on the comparison.

2. The method of claim 1, where in the errors are one of the following:
   a. the time sampled measured surface loads are incorrect, or;
   b. the time sampled measured surface loads are correct, but one or more equipment input parameters are incorrect, or;
   c. the time sampled measured surface loads are correct, but frictional forces acting along the rod-string affect the measured surface loads.

3. The method of claim 2, wherein the calculated downhole position values are plotted directly from raw wave equation output and are not artificially shifted to align a downhole dynamometer card position to a surface dynamometer card.

4. The method of claim 3, wherein the calculated downhole load vs. position dynamometer plot resides along a known load, referenced by the pump state.

5. The method of claim 2, wherein the indication of incorrect surface load measurements are obtained by a placement of a calculated downhole pump dynamometer card, shifted along a known diagonal relative to its expected placement, and,
   a magnitude of load error corresponds to a vertical difference relative to the expected placement, and a verification of said load error is determined by a diagonal shifting of said load error with respect to calculated load and position.

6. The method of claim 5, wherein the load error is determined to be related to a load-cell calibration, or incorrect input parameters by analyzing the shifting of the dynamometer plot relating to pump states during a pumping cycle, and,
   load and position shifting analysis, used to determine input load error, is repeated for a plurality of wells to identify a set of wells where load-cell calibration is incorrect and, manual calibration and verification is scheduled.

7. The method of claim 5, wherein the presence and/or magnitude of the load error is conveyed to the user.

8. The method of claim 5, wherein the load error is presented as an alarm.

9. The method of claim 5, wherein a corrective load offset or scaling factor is applied to raw load data for improving accuracy of operational well control or for preforming accurate well performance analysis.

10. The method of claim 9, wherein the corrective load offset or scaling factor is automatically applied at a load-cell signal conversion such that subsequent digitized load values are corrected and accurate.

11. A method for determining the location and magnitude of downhole frictional forces in a rod pumped well, comprising; obtaining operational equipment parameters comprising rod material and elasticity, pumping speed, fluid properties, pressures; obtaining time synchronized measured surface load and position data points through a given stroke, wherein; determining the measured surface loads and positions are correct and accurate, and; processing the operational parameters using a wave equation to obtain calculated load and position data points at a distance from the point of the measured load and position, wherein dynamic acceleration and stretch of the rods under measurement are removed, and; shifting the calculated load and position data points horizontally with position, and vertically with load relative to an expected value of said calculated load and position data points, wherein; the shifting of said calculated downhole load and position data points, due to friction, corresponds to the direction of rod travel during the upstroke or downstroke, inclusive of frictional forces,
   and determining location and magnitude of downhole frictional forces acting along said rods through said shifting of calculated data points relative to an expected value, along a distinct diagonal; controlling operation of a pump based on the location and magnitude of the downhole frictional forces.

12. The method of claim 11, wherein downhole friction acting on the rod-string is indicated by a distortion, or shifting, of the calculated downhole dynamometer card relative to expected loads during a pump state.

13. The method of claim 12, wherein the location and magnitude of downhole friction is indicated by the diagonal shifting of a calculated downhole load and position data point along a distinct diagonal relative to the expected load, referenced by the pump state, wherein;
   the location and magnitude of said downhole friction is used to generate a map of friction relative to depth.

14. The method of claim 13, wherein the friction map of the wellbore is subsequently utilized as an input to the wave equation such that the resulting downhole dynamometer card represents the loads felt by the pump, and are not reflective of friction accumulated in the calculations from the point of measured surface load and position to the calculated pump load and position.

15. The method of claim 13, wherein the distinct diagonal shifting is represented by a spring constant of a quantifiable length of rods and corresponding rod properties to a point of downhole friction and, the magnitude of a tensile induced friction load is represented by the shifted loads relative to the expected load, referenced by the pump state.

16. The method of claim 15, wherein the downhole friction mapping is derived from a set of friction points and magnitudes that restores, when incorporated into a wave equation, a calculated downhole pump card to the expected loads during each phase of a pumping cycle.

17. The method of claim 11, wherein external load effects are attributable to downhole friction or other non-frictional parameters such as pressures, fluid properties, and;
   a source of said external load effects is identified through analyzing the direction of rod travel and corresponding calculated results relative to a distinct diagonal placement.

18. The method of claim 11, wherein the downhole friction forces acting along said rods are identified by depth without the aid of a wellbore deviation survey.

19. The method of claim 11, wherein wellbore geometry from a deviation survey is incorporated to further improve the attribution of mapped frictional forces to physical wellbore path deviations.

* * * * *